United States Patent
Lu et al.

(10) Patent No.: US 9,545,956 B2
(45) Date of Patent: Jan. 17, 2017

(54) LINER SYSTEM FOR BED OF A MACHINE

(71) Applicant: Caterpillar Inc., Peoria, IL (US)

(72) Inventors: Qiaoyu Lu, Dunlap, IL (US); Aaron Kenneth Amstutz, Peoria, IL (US); Andrea Burgess Tognetti, Dunlap, IL (US); Daniel Raymond Hettinger, Monticello, IL (US); Jeremy Roe Hammar, Metamora, IL (US); Kevin L. Martin, Washburn, IL (US); Kyle Schmitt, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/067,197

(22) Filed: Mar. 11, 2016

(65) Prior Publication Data
US 2016/0194035 A1 Jul. 7, 2016

(51) Int. Cl.
*B62D 25/20* (2006.01)
*B60R 13/01* (2006.01)

(52) U.S. Cl.
CPC .......... *B62D 25/2072* (2013.01); *B60R 13/01* (2013.01); *B60R 2013/015* (2013.01); *B60R 2013/018* (2013.01)

(58) Field of Classification Search
CPC .............. B60R 13/01; B60R 2015/015; B60R 2015/018; B62D 25/2072; B62D 25/2054
USPC ........... 296/39.2, 181.3, 182.1, 183.1, 183.2
See application file for complete search history.

(56) References Cited

U.S. PATENT DOCUMENTS

| | | | | |
|---|---|---|---|---|
| 3,912,325 A | * | 10/1975 | Sudyk | B60R 13/01 105/423 |
| 4,029,354 A | * | 6/1977 | Valeri | B60P 1/286 105/423 |
| 5,851,043 A | | 12/1998 | Moutrey et al. | |
| 6,000,741 A | * | 12/1999 | Reynolds | B60R 13/01 296/39.2 |
| 6,129,409 A | * | 10/2000 | D'Amico | B60R 13/01 296/183.2 |
| 6,174,014 B1 | * | 1/2001 | Hook | B60P 1/286 296/183.2 |
| 6,283,527 B1 | * | 9/2001 | Desmarais | B60P 1/00 280/759 |
| 6,854,808 B2 | * | 2/2005 | Kostecki | B60P 1/286 296/183.2 |

(Continued)

FOREIGN PATENT DOCUMENTS

WO 2015109361 7/2015

*Primary Examiner* — Gregory Blankenship

(57) ABSTRACT

A liner system for a bed of a material hauling machine is provided. The liner system includes a first panel having a first surface and a second surface. The second surface includes a plurality of projected sections and defines a recess between each of the plurality of projected sections and a keyway recess. The liner system also includes a second panel having a first lip portion and a second lip portion configured to interconnect with the second and first lip portion of adjacent second panels respectively. The second panel also includes a first protruding portion configured to be received into the recess and a second protruding portion configured to be received into the keyway recess. The liner system further includes a locking panel having a first extension member, a second extension member and one or more fastening means configured to fasten the second panel to the first panel.

1 Claim, 5 Drawing Sheets

(56) References Cited

U.S. PATENT DOCUMENTS

| | | | |
|---|---|---|---|
| 8,141,928 B2* | 3/2012 | Zamorano Jones | B61D 7/00 296/182.1 |
| 8,287,791 B2* | 10/2012 | Stackpole | B29C 39/006 264/271.1 |
| 8,708,391 B2 | 4/2014 | Dunn et al. | |
| 2008/0277959 A1* | 11/2008 | Boddie | B60R 11/00 296/39.2 |
| 2009/0015028 A1* | 1/2009 | Zamorano Jones | B61D 17/18 296/39.2 |
| 2015/0061311 A1 | 3/2015 | Natarajan et al. | |
| 2016/0046244 A1* | 2/2016 | Chewning | B02C 17/22 296/39.2 |
| 2016/0194035 A1* | 7/2016 | Lu | B60R 13/01 296/39.2 |

\* cited by examiner

LINER SYSTEM FOR BED OF A MACHINE

TECHNICAL FIELD

The present disclosure relates to a bed of a material hauling machine. More specifically, the present disclosure relates to a liner system to be attached to the bed of the material hauling machine.

BACKGROUND

Material hauling machines such as a haul truck, a mining truck, a pickup truck, and so on include a bed for hauling material from one location to another. Due to continuous use, impacts and friction from the material may cause wear and tear of the bed. Complete replacement of the worn out bed may be a costly solution.

Hence, the bed may be protected with the use of liners. These liners may cover a load bearing surface of the bed and act as a sacrificial surface to protect the bed from damage or wear. After considerable wear and tear of the liner, a selective portion or the complete liner may be replaced with a new one.

U.S. Pat. No. 8,708,391 describes a system for providing replaceable wear surfaces on abrasive-material handling-equipment. The system includes at least one replaceable surface structured and arranged to provide the replaceable surface onto the abrasive-material handling-equipment. The replaceable surface includes at least one wear-resister element structured and arranged to resist wear of the replaceable surface. The replaceable surface includes at least one magnet structured and arranged to magnetically attach the replaceable surface to the abrasive-material handling-equipment. The magnet includes at least one permanent attached structured and arranged to permanently attach with the replaceable surface.

Currently used liners may use mechanical fasteners or magnetic materials to attach the liners to the bed. However, such systems may be expensive and may require considerable effort during installation and/or uninstallation thereof. Hence, there is a need for an improved design of the liner for installation on the bed of the machine.

SUMMARY OF THE DISCLOSURE

In an aspect of the present disclosure, a liner system for a bed of a material hauling machine is disclosed. The liner system includes a first panel. The first panel includes a first surface fixedly mounted to the bed of the material hauling machine. The first panel also includes a second surface mutually opposite to the first surface. The second surface includes a plurality of projected sections spaced part from one another and defining a recess between each of the plurality of projected sections along a first axis and a keyway recess along a second axis of the second surface.

The liner system also includes a second panel configured to be removably attached on the first panel. The second panel includes a first lip portion defined between a bottom surface and a top surface of the second panel. The second panel includes a second lip portion defined between the bottom surface and the top surface of the second panel. The second lip portion is mutually opposite to the first lip portion. The second lip portion is configured to interconnect with the first lip portion of an adjacent second panel. The second panel also includes a first protruding portion extending along a third axis of the bottom surface. The first protruding portion is configured to be received into the recess defined by the plurality of projected sections of the first panel. The second panel further includes a second protruding portion extending along a fourth axis of the bottom surface. The second protruding portion is configured to be received into the keyway recess of the first panel.

The liner system further includes a locking panel. The locking panel includes a first extension member defined between a lower surface and an upper surface of the locking panel. The first extension member is configured to interconnect with the second lip portion of the second panel. The locking panel also includes a second extension member defined between the lower surface and the upper surface of the locking panel. The second extension member is mutually opposite to the first extension member. The second extension member is configured to interconnect with the first lip portion of the adjacent second panel. The locking panel further includes one or more fastening means defined on the upper surface of the locking panel. The one or more fastening means is configured to fasten the second panel to the first panel.

Other features and aspects of this disclosure will be apparent from the following description and the accompanying drawings.

DETAILED DESCRIPTION

Figure 1:
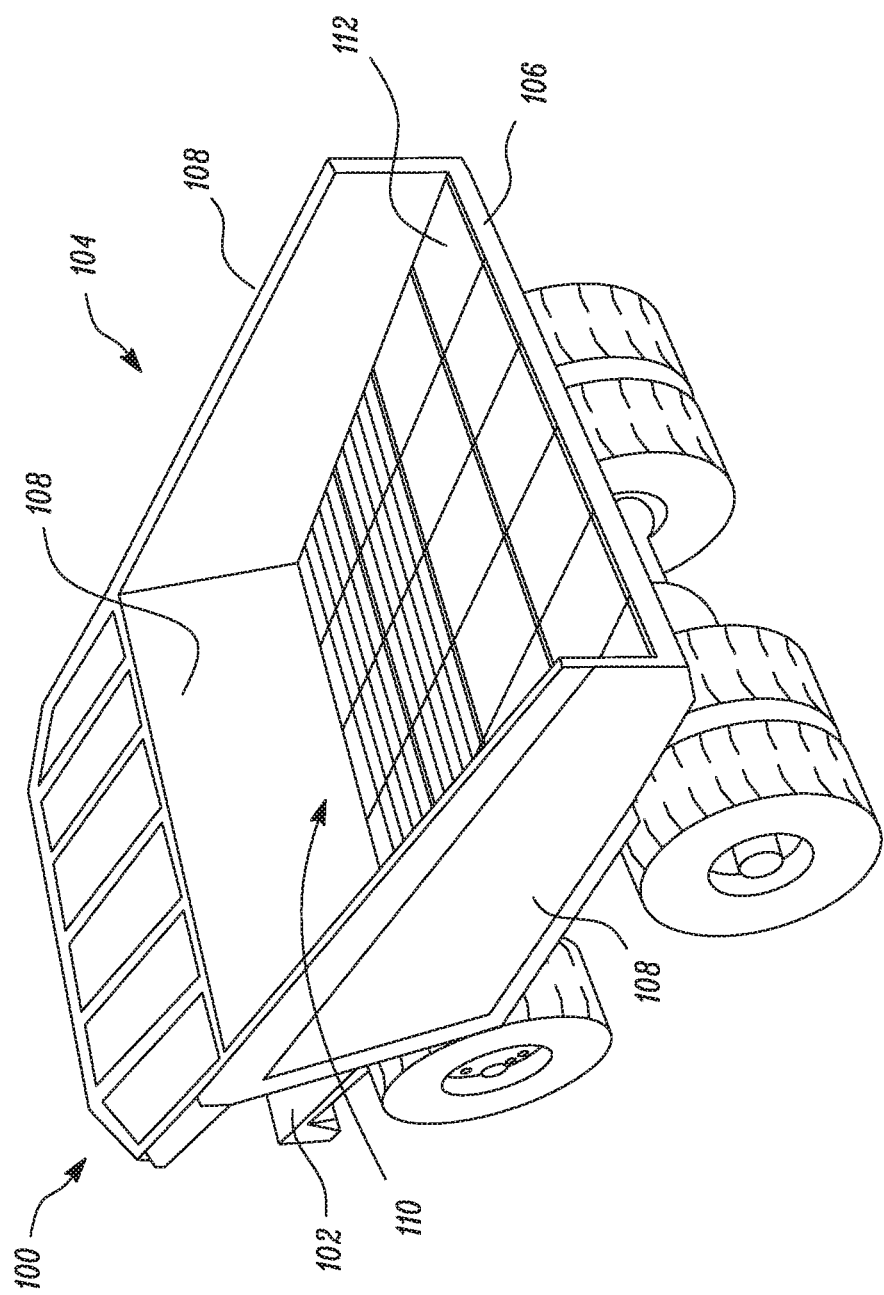
FIG. 1 is a perspective view of an exemplary machine having a bed with a liner system, according to one embodiment of the present disclosure.

Wherever possible, the same reference numbers will be used throughout the drawings to refer to the same or the like parts. Referring to FIG. 1, an exemplary material hauling machine 100 (hereinafter referred to as machine 100) is illustrated. More specifically, the machine 100 is a mining truck. In other embodiments, the machine 100 may be any other machine including, but not limited to, a haul truck and a pickup truck. The machine 100 is configured to transport material such as construction material, soil, ore, and so on from one location to another.

The machine 100 includes a frame 102. The frame 102 is configured to mount and/or support various components of the machine 100 including, but not limited to, an engine system, a transmission system, and an operator cabin. The frame 102 supports a bed 104. The bed 104 is configured to receive and transport the material from one location to another. The bed 104 includes a floor 106 and a number of side walls 108. The floor 106 and the side walls 108 are disposed in a manner such that a hollow, load receiving volume 110 is formed therein. In other embodiments, the bed 104 may include only the floor 106 and the side walls 108 may be omitted as required in case of hauling machinery or equipment having a size larger than that of the floor 106.

The floor 106 includes a liner system 112 installed thereon. The liner system 112 is configured to provide a wear surface over the floor 106. More specifically, the liner system 112 acts as an intermediate surface between the floor 106 and the material received on the bed 104. During use, the liner system 112 is exposed to wear due to erosion caused by loading and unloading of material thereon. The liner system 112 will now be explained in more detail with reference to FIGS. 2 to 5.

Figure 2:
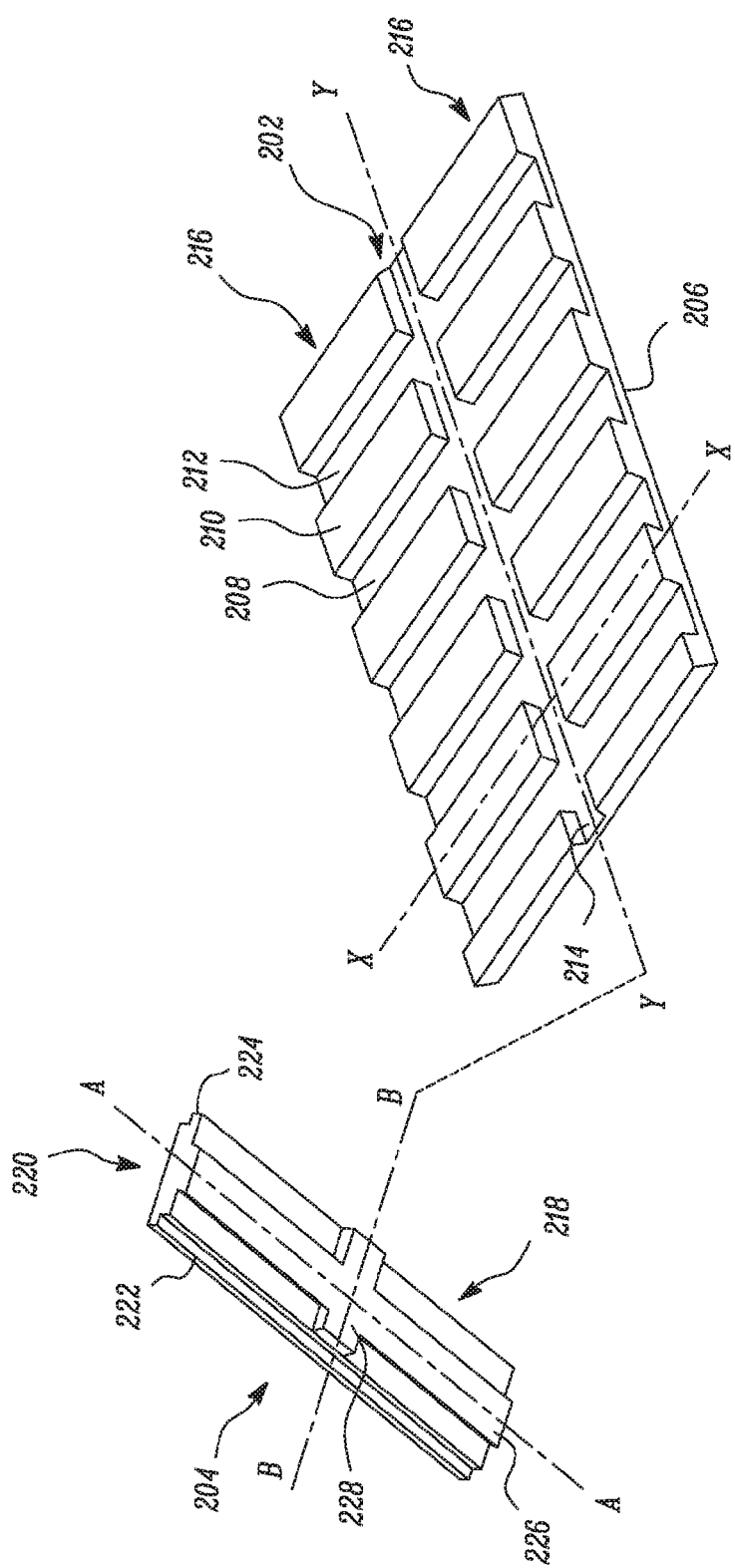
FIG. 2 is a perspective exploded view of a first panel and a second panel of the liner system, according to one embodiment of the present disclosure.
Figure 3:
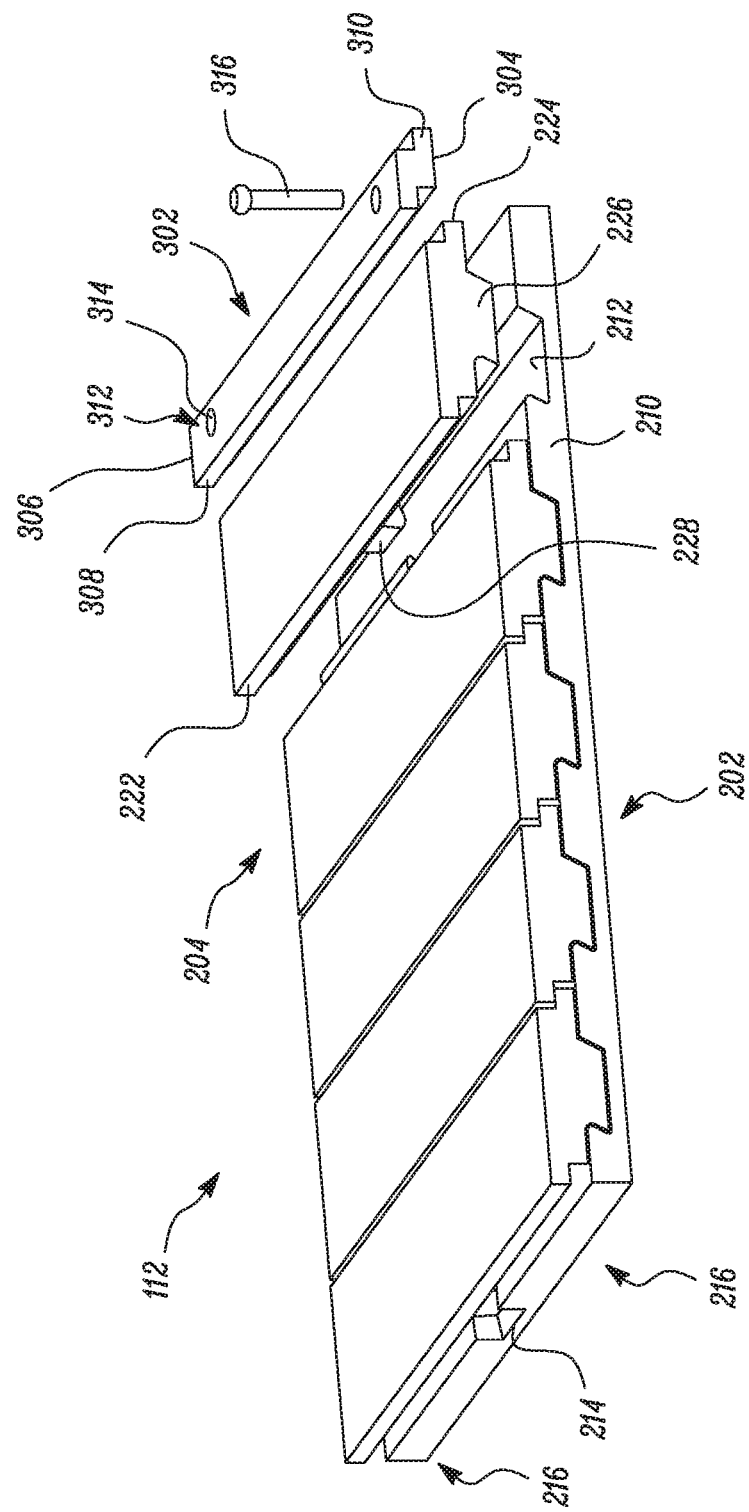
FIG. 3 is a perspective assembled view of the first panel and the second panel, according to one embodiment of the present disclosure.

Referring to FIGS. 1 to 3, the liner system 112 includes a first panel 202 and a second panel 204. The first panel 202 has a substantially rectangular and planar configuration. The first panel 202 may be made of any material, including, but not limited to, polyurethane, rubber, plastic, composite material, and metal. The first panel 202 includes a first surface 206. The first surface 206 is configured to be fixedly mounted to the bed 104 of the machine 100. The first surface 206 is affixed to the bed 104 by any known fastening means such as, adhesion, welding, bolting, and so on.

The first panel 202 also includes a second surface 208. The second surface 208 is mutually opposite to the first surface 206. The second surface 208 includes a number of projected sections 210. Each of the projected sections 210 extends from one end of the first panel 202 to another end along a first axis X-X. Each of the projected sections 210 is spaced apart from one another in a manner such that a recess 212 is defined between adjacent projected sections 210.

Further, the first panel 202 includes a keyway recess 214. The keyway recess 214 extends along a second axis Y-Y of the second surface 208 in a manner such that the keyway recess 214 undercuts each of the projected sections 210 to form two rows 216 of the projected sections 210. The second surface 208 of the first panel 202 includes one keyway recess 214. In other embodiments, the first panel 202 may include more than one keyway recess 214 in a spaced apart arrangement. Accordingly, in such embodiments, the first panel 202 may include multiple rows 216 of the projected sections 210 depending on the number of the keyway recesses 214.

The second panel 204 is configured to be removably attached to the first panel 202. The second panel 204 may be made of any material including, but not limited to, polyurethane, rubber, plastic, and composite material. The second panel 204 includes a bottom surface 218 and a top surface 220. The second panel 204 includes a first lip portion 222 defined between the bottom surface 218 and the top surface 220. More specifically, the first lip portion 222 extends parallel to a third axis A-A of the second panel 204 and along one end of the second panel 204. The first lip portion 222 is configured to interconnect with a second lip portion 224 of an adjacent second panel 204 (see FIG. 3).

As shown in FIG. 2, the second panel 204 also includes the second lip portion 224 defined between the bottom surface 218 and the top surface 220. More specifically, the second lip portion 224 extends parallel to the third axis A-A of the second panel 204 and along another end of the second panel 204 and mutually opposite to the first lip portion 222. The second lip portion 224 is configured to interconnect with a first lip portion 222 of the adjacent second panel 204 (see FIG. 3).

The second panel 204 also includes a first protruding portion 226. More specifically, the first protruding portion 226 extends along the third axis A-A and parallel to the first lip portion 222 and the second lip portion 224. The first protruding portion 226 is configured to be received into the recess 212 defined by the projected sections 210 of the first panel 202.

The second panel 204 also includes a second protruding portion 228. More specifically, the second protruding portion 228 extends along a fourth axis B-B of the second panel 204. More specifically, the second protruding portion 228 is perpendicular to the first lip portion 222, the second lip portion 224, and the first protruding portion 226 in a manner such that the second protruding portion 228 intersects the first protruding portion 226. The second protruding portion 228 is configured to be received into the keyway recess 214 of the first panel 202.

Referring to FIG. 3, the liner system 112 includes a number of the second panels 204 removably affixed to the first panel 202. More specifically, the first protruding portion 226 of each of the second panels 204 is received into the recesses 212 of the first panel 202. Similarly, the second protruding portion 228 of each of the second panels 204 is received into the keyway recess 214 of the first panel 202. Also, the first lip portion 222 of each of the second panels 204 is interlocked with the second lip portion 224 of the adjacent second panel 204. Similarly, the second lip portion 224 of each of the second panels 204 is interlocked with the first lip portion 222 of the adjacent second panel 204.

Additionally, the liner system 112 includes a locking panel 302. The locking panel 302 is configured to lock the second panels 204 to the first panel 202 and the bed 104 respectively. The locking panel 302 may be made of any material including, but not limited to, polyurethane, rubber, plastic, composite material, and metal. In the embodiment when the locking panel 302 may be made of metal, the locking panel 302 may be covered with a material similar to the material of the first panel 202 and/or the second panel 204.

The locking panel 302 includes a lower surface 304 and an upper surface 306. The locking panel 302 includes a first extension member 308 defined between the lower surface 304 and the upper surface 306. The first extension member 308 is configured to interconnect with the second lip portion 224 of the second panel 204. The locking panel 302 also includes a second extension member 310 defined between the lower surface 304 and the upper surface 306. The second extension member 310 is mutually opposite to the first extension member 308. The second extension member 310 is configured to interconnect with the first lip portion 222 of the adjacent second panel 204.

The locking panel 302 also includes one or more fastening means 312 defined on the upper surface 306 of the locking panel 302. The fastening means 312 is configured to fasten the second panel 204 to the first panel 202 and/or the bed 104. More specifically, the fastening means 312 includes through holes 314 defined on the upper surface 306 and the lower surface 304 of the locking panel 302. The holes 314 are configured to receive fastening members 316 such as bolts, screws, straps, and so on to fasten the second panel 204 to the first panel 202 and/or the bed 104.

Figure 4:
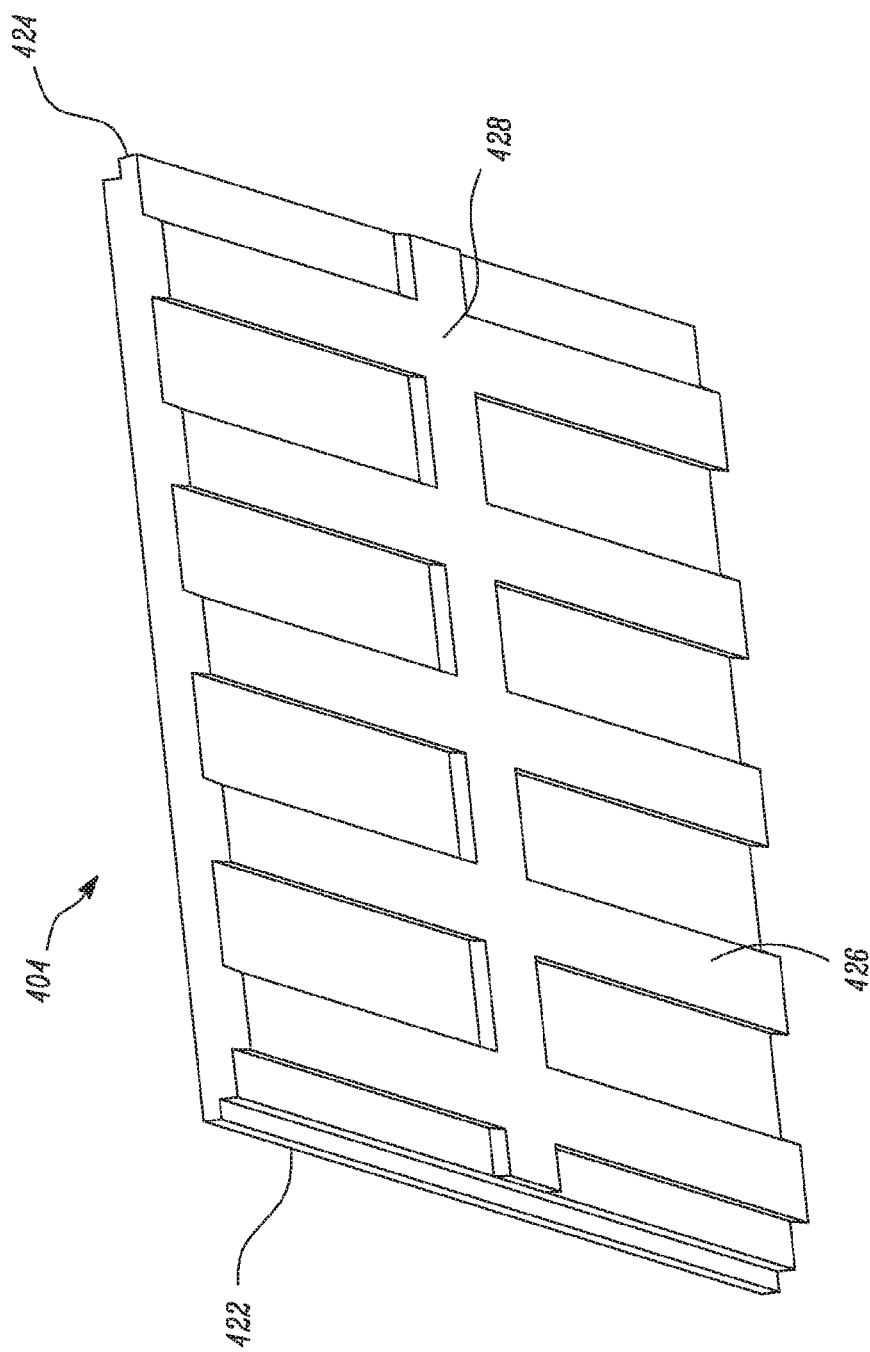
FIG. 4 is a perspective view of another second panel, according to another embodiment of the present disclosure.

FIG. 4 illustrates another second panel 404 embodied as a conjoint panel 404 (herein after interchangeably referred to as second panel 404 or conjoint 404). The conjoint panel 404 is a larger version of the second panel 204 having a similar structure to the second panels 204 described in reference with FIGS. 2 and 3. The conjoint panel 404 is a single component. The conjoint panel 404 includes a first lip portion 422 and a second lip portion 424 for connecting the conjoint panel 404 to another conjoint panel 404 and/or second panel 204. Additionally, the conjoint panel 404 includes a number of first protruding portions 426 and a second protruding portion 428 for connecting the conjoint panel 404 to the first panel 202 (see FIGS. 2, 3 and 5). It should be noted that the dimension of the conjoint panel 404 may vary based on the requirement of the application.

Figure 5:
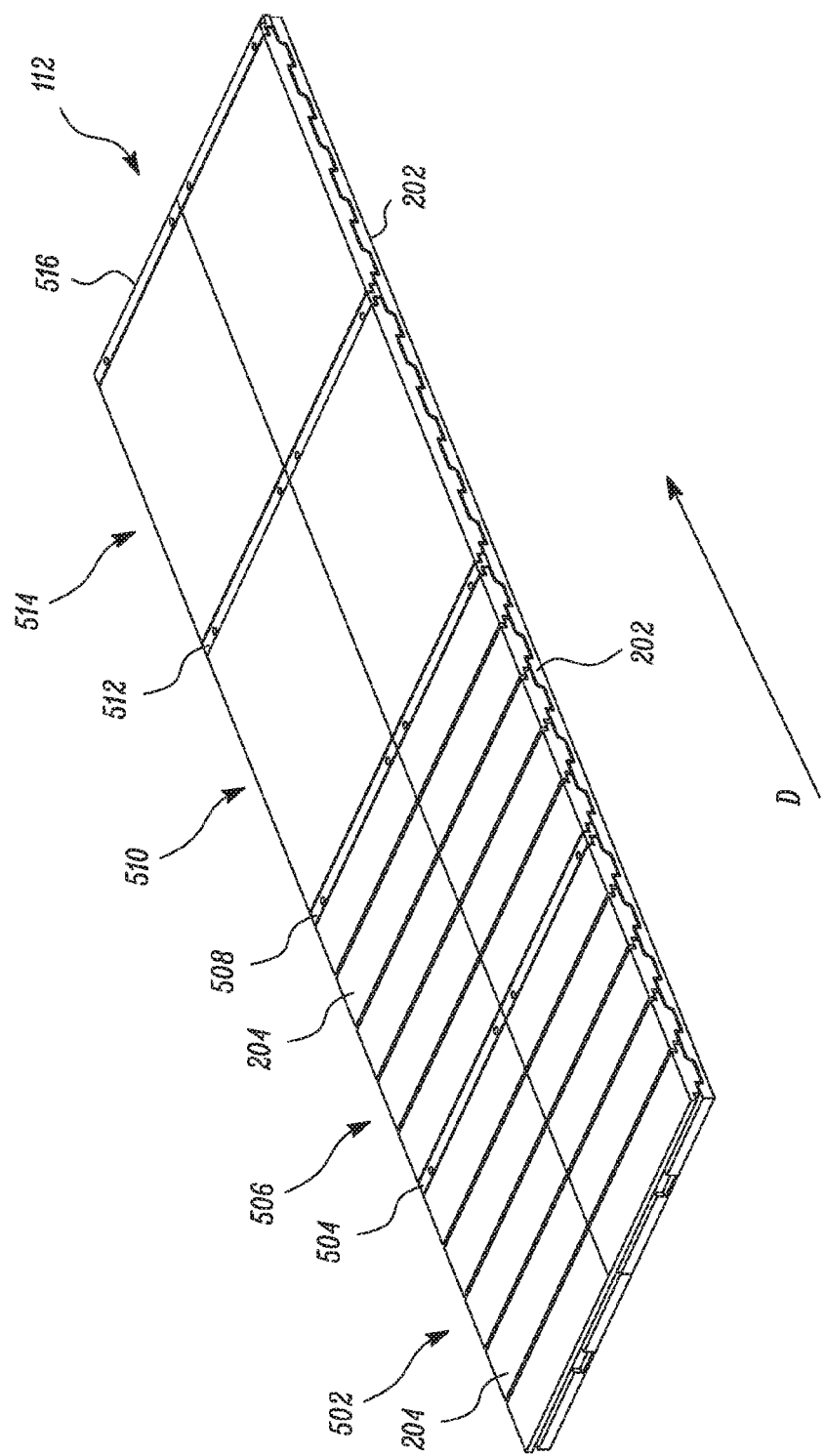
FIG. 5 is a perspective assembled view of the liner system, according to one embodiment of the present disclosure.

Referring to FIG. 5, the liner system 112 includes a first set 502 of the second panels 204. Each of the second panels 204 of the first set 502 is assembled onto the first panels 202 along a direction "D" in an adjacent manner. The first set 502 of the second panels 204 includes five second panels 204. Alternatively, the number of second panels 204 in the first set 502 may vary. The first set 502 of the second panels 204 is followed by a first locking panel 504 similar to the locking panel 302 as described with reference to FIG. 3.

The first locking panel 504 is then followed by a second set 506 of the second panels 204. Each of the second panels 204 of the second set 506 is assembled one after the other as described with reference to FIG. 2 in the direction "D". The second set 506 of the second panels 204 includes five second panels 204. Alternatively, the number of second panels 204 in the second set 506 may vary. The second set 506 of the second panels 204 is then followed by a second locking panel 508 similar to the locking panel 302 as described with reference to FIG. 3.

The second locking panel 508 is then followed by a first conjoint panel 510 similar to the conjoint panel 404 as described with reference to FIG. 4. The first conjoint panel 510 is followed by a third locking panel 512 similar to the locking panel 302 as described with reference to FIG. 3. The third locking panel 512 is then followed by a second conjoint panel 514 similar to the conjoint panel 402 as described with reference to FIG. 4. The second conjoint panel 514 is further followed by a fourth locking panel 516 similar to the locking panel 302 as described with reference to FIG. 3.

The arrangement of the second panels 204, the conjoint panels 402 and the locking panels 302 described herein is merely exemplary. The liner system 112 may include any number and combination of the first panels 202, the second panels 204, the conjoint panels 402 and/or the locking panels 302 based on application requirements to cover at least a portion of or the complete floor 106.

Even though the configuration shown in the FIG. 5 includes a combination of the second panels 204 and conjoint panels 404 to create the liner system 112, it is evident to a person skilled in the art that the liner system 112 may include only any one of the second panels 204 or conjoint panels 404.

In various other embodiments (not shown), the liner system may include single panels removably affixed to the floor 106. In such a situation, the panels may have a flat, tile like configuration.

For example, in one embodiment, each panel may be affixed to the floor 106 using a fastening member such as a wire rope, a cable, a U-bolt, and so on. The fastening member may pass through the floor 106 and the panel and may be fastened back to the floor 106. In some case, a polymeric stake or screw may be attached to the floor 106 and may pass through each panel and protruding above the panel. After assembly, the protruding part of the polymeric stake or screw may be welded or heated down to the surface of the panel.

In another embodiment, wires or cables may be passed through each panel. The panels may be affixed in place on the floor 106 by mounting the wires or cables to the floor 106. In another embodiment, rows or columns of the panels may be connected by the wires or cables. The ends of the wires or cables may then be mounted on the floor 106.

In another embodiment, polymeric plates may be inserted between adjacent panels to connect the panels together. The panels may be welded to the polymeric plates using polymeric bolts to hold and assemble the panels together. The weld areas may then be covered by caps made of a material similar to that of the panels. Further, the complete assembly of panels may be fastened to the floor 106 using adhesion, screws, bolts, and so on.

In another embodiment, the individual panels may be molded in the form of a jigsaw puzzle. Edges of each panel may include grooves and teeth which may interlock with corresponding teeth and grooves of adjacent panels. Varying combination of grooves, teeth, tongue, and so on may be used to vary the interlocking strength. An assembly of such interlocking panels may then be used to cover the floor 106 and may be affixed thereon using adhesion, screws, bolts, and so on.

In some embodiments, the liner system may include two panels, viz., a bottom panel and a top panel. An upper surface of the bottom panel and a lower surface of the top panel may be lined with male and female portions, in any combination, of a VELCRO™ type material. During assembly, the male and female portions of the bottom panel and the top panel may be aligned together to affix the bottom panel and the top panel. During disassembly, the top panel may be simply peeled off from the bottom panel to separate the top panel from the bottom panel.

In another embodiment, the upper surface of the bottom panel and the lower surface of the top panel may include mating interfaces. For example, the bottom panel may include stems of a particular shape such as a mushroom and the top panels may include holes having a shape corresponding to the shape of the stem or vice versa. Alternatively, the holes may be replaced by bracket-like structures to receive the stems therein. During assembly, the stems may be snapped into the holes or the bracket-like structures to affix the top panel over the bottom panel. During disassembly, the top panel may be pulled against the bottom panel to snap off the stems from the holes or the bracket-like structures and separate the top panel from the bottom panel.

INDUSTRIAL APPLICABILITY

The present disclosure provides the liner system 112 having a two-part system including the first panels 202 and the second panels 204, 404. The first panels 202 are configured to be fixedly attached to the floor 106. The second panels 204, 404 are configured to be removably attached to the first panels 202. As such the second panels 204, 404 may experience the wear and tear due to contact with the material to be hauled. In case of extreme wear and tear or any other reason, as and when required, the second panels 204, 404 may be separated from the first panels 202 and a new set of the second panels 204, 404 may be affixed to the first panels 202. Also, the first panels 202 may remain fixed to the floor 106 and may not have to be replaced each time the second panels 204, 404 may need replacement.

The liner system 112 provides a cost effective solution whereby only desired second panels 204, 404 may be replaced depending on the degree of wear or damage. Further, the design of the second panels 204, 404 is such that the number and shape of the second panels 204, 404 accommodated on the liner system 112 may vary based on the size of the bed 104. Accordingly, the bed 104 may include only the second panels 204 (see FIG. 3), only the second panels 404 (see FIG. 4), or a combination of the second panels 204, 404 (see FIG. 5). Further, the structure of the liner system 112 is such that the first panel 202, the second panel 204, 404 and/or the locking panel 302 may be easily assembled or disassembled, reducing corresponding time associated with such activities. Additionally, the liner system 112 may provide reduction of noise generated during loading and/or unloading the material from the floor 106 of the bed 104.

While aspects of the present disclosure have been particularly shown and described with reference to the embodiments above, it be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A liner system for a bed of a material hauling machine, the liner system comprising:
   a first panel including:
      a first surface fixedly mounted to the bed of the material hauling machine; and
      a second surface mutually opposite to the first surface, wherein the second surface includes a plurality of projected sections spaced part from one another and defining a recess between each of the plurality of projected sections along a first axis and a keyway recess along a second axis of the second surface;
   a second panel configured to be removably attached on the first panel, the second panel including:
      a first lip portion defined between a bottom surface and a top surface of the second panel;
      a second lip portion defined between the bottom surface and the top surface of the second panel, wherein the second lip portion is mutually opposite to the first lip portion, wherein the second lip portion is configured to interconnect with the first lip portion of an associated second panel;
      a first protruding portion extending along a third axis of the bottom surface, wherein the first protruding portion is configured to be received into the recess defined by the plurality of projected sections of the first panel; and
      a second protruding portion extending along a fourth axis of the bottom surface, wherein the second protruding portion is configured to be received into the keyway recess of the first panel; and
   a locking panel including:
      a first extension member defined between a lower surface and an upper surface of the locking panel, wherein the first extension member is configured to interconnect with the second lip portion of the second panel;
      a second extension member defined between the lower surface and the upper surface of the locking panel, wherein the second extension member is mutually opposite to the first extension member, wherein the second extension member is configured to interconnect with the first lip portion of the adjacent second panel; and
      one or more fastening means defined on the upper surface of the locking panel, the one or more fastening means configured to fasten the second panel to the first panel.

* * * * *